July 14, 1931.   O. C. TRAVER   1,814,869
CIRCUIT PROTECTION
Filed Aug. 20, 1925   3 Sheets-Sheet 2

Inventor:
Oliver C. Traver,
by His Attorney.

July 14, 1931. O. C. TRAVER 1,814,869
CIRCUIT PROTECTION
Filed Aug. 20, 1925 3 Sheets-Sheet 3

Inventor:
Oliver C. Traver,
by
His Attorney.

Patented July 14, 1931

1,814,869

UNITED STATES PATENT OFFICE

OLIVER C. TRAVER, OF SCHENECTADY, NEW YORK, ASSIGNOR TO GENERAL ELECTRIC COMPANY, A CORPORATION OF NEW YORK

CIRCUIT PROTECTION

Application filed August 20, 1925. Serial No. 51,499.

My invention relates to circuit protection and more particularly to improvements in protective systems and apparatus for controlling an electric circuit on the occurrence of abnormal conditions with a discriminating action dependent on the distance between the point of fault and some other point, that is, some function of the reactance or resistance or both of the circuit between two points, whereby a faulty portion or section of the circuit can be disconnected selectively without interrupting continuity of service on the remainder of the circuit.

My invention will be better understood from the following description taken in connection with the accompanying drawings and its scope will be pointed out in the appended claims.

Figure 1:
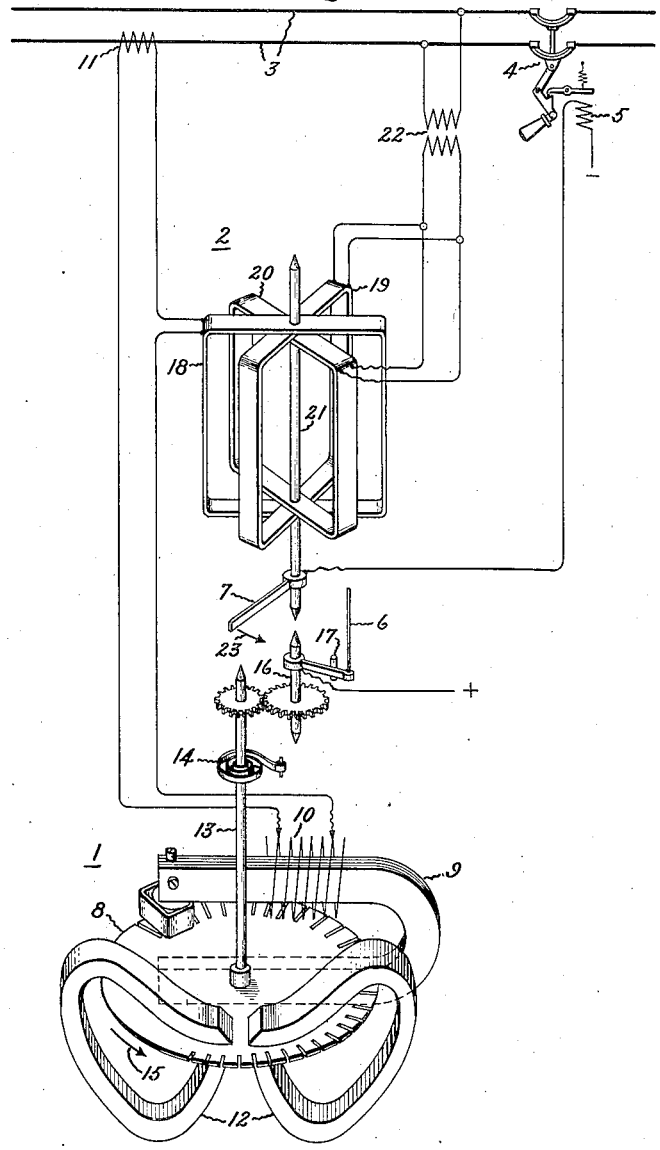
Figure 2:
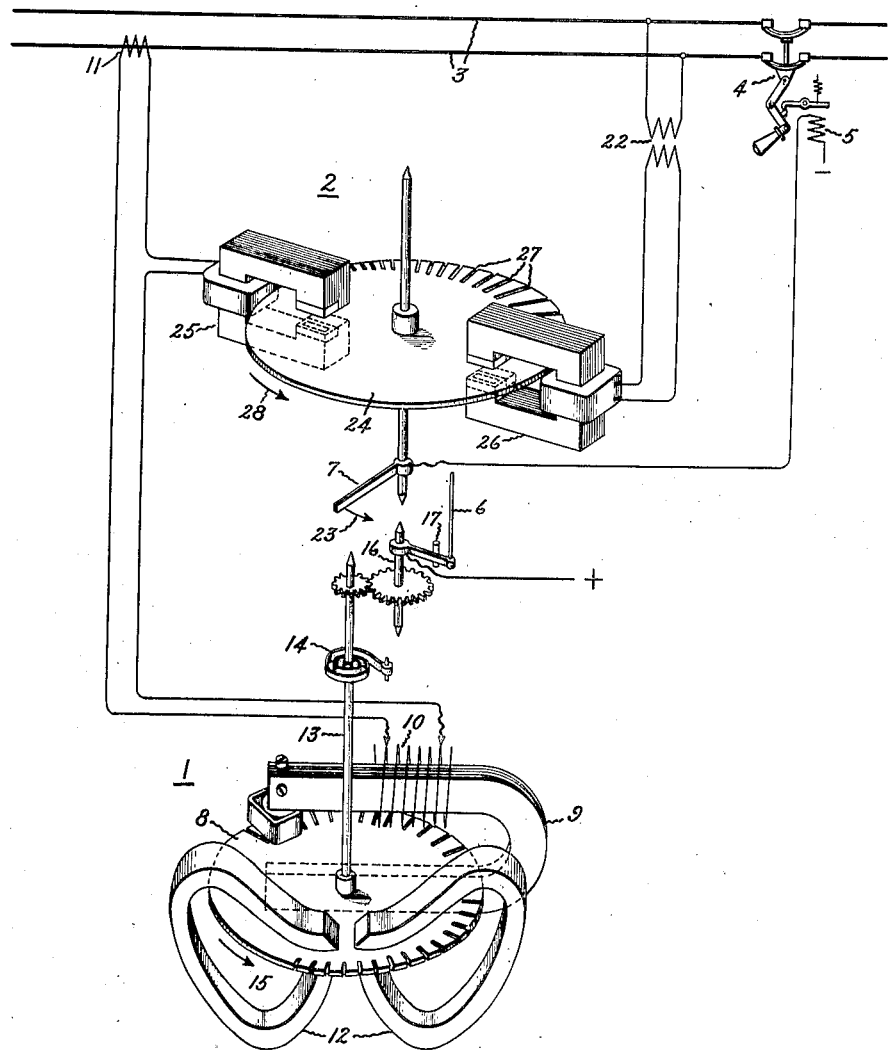
Figure 3:
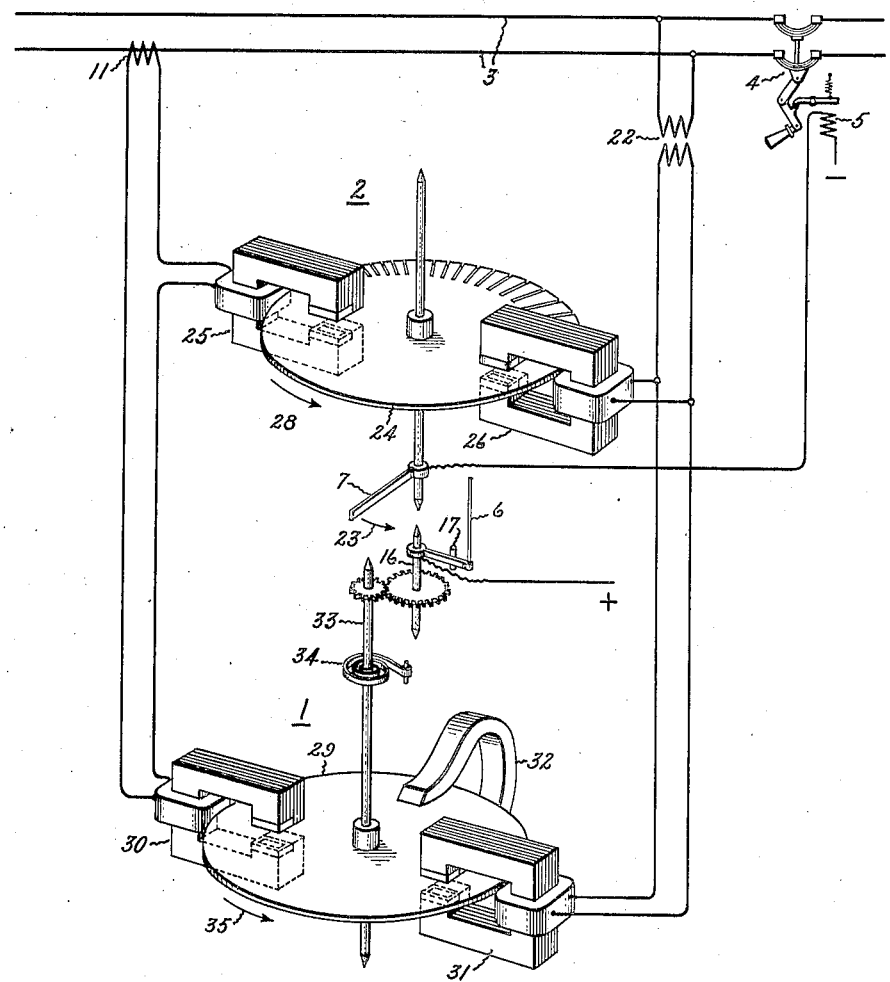

In the accompanying drawings, Fig. 1 illustrates partly in diagram and perspective, protective apparatus embodying my invention, and Figs. 2 and 3 similarly illustrate other embodiments of my invention.

In a faulty electric circuit, the ratio of the potential to the current increases continuously from the fault point to the source. According to my invention, I make use of this variation in the ratio selectively to determine the time of action of a time limit electroresponsive device 1 by another electroresponsive device, such as an ohm meter 2, which is arranged to function in conformance with an ohmic characteristic of a circuit 3, that is some function of the resistance or reactance or both of the circuit between two points thereof, such as a fault point and the point where the protective apparatus is located. For interrupting the circuit 3 on the occurrence of abnormal conditions, there is provided a circuit breaker 4 having a trip coil 5, the circuit of which is arranged to be controlled through relatively movable cooperating members, such as contacts 6 and 7, respectively arranged to be actuated by the time limit device 1 and the ohm meter 2. It is, of course, to be understood that circuit breakers 4 are provided at different points of the circuit 3 such as supply and distributing stations so that on the occurrence of a fault the minimum interruption of service occurs, as for example in a net work system, only the faulty section would be disconnected.

The time limit device 1, as illustrated in Figs. 1 and 2, may be of the over-current time limit type disclosed in Letters Patent 1,539,812 of the United States, issued to C. I. Hall on May 26, 1925, for nonsaturating induction relay and assigned to the same assignee as the present invention. This time limit relay comprises a movable member, such as an induction disk 8, arranged to be driven by a shaded pole motor element comprising a magnet 9 and an energizing winding 10 connected to be energized in accordance with the current in the circuit 3. For this purpose, the winding may be connected in series with the secondary of a current transformer 11. Although for simplicity, only one pole of the magnet 9 is shown shaded, it is obvious that both poles may be provided with shading coils. The disk 8, which tends to move at a speed dependent on the current in the circuit 3, is retarded by the damping action of the flux of permanent magnets 12 and also the flux of the driving magnet 9. A spindle 13 on which the disk 8 is mounted is biased by a spring 14 so as to tend to move the disk in a direction opposite that indicated by the arrow 15. The spindle 13 is suitably geared to a movable member such as a spindle 16, which carries the contact 6 and normally the spring 14 holds this contact against a stop 17. The disk 8 is slotted so that, as it turns in the direction indicated by the arrow 15 under the influence of a predetermined current, more and more material of the disk is interposed between the poles of the driving magnet 9 so as to compensate for the increasing counter torque of the spring 14.

Referring now to Fig. 1, the ohm meter 2 may be of the moving coil dynamometer type comprising three coils 18, 19 and 20, two of which, 18 and 19, are stationary and one of which, 20, is movable and is mounted on a spindle 21 which carries the contact 7. The spindle 21 may be arranged in line with the spindle 16, which carries the contact 6. As shown, the coil 18 is connected to be energized in accordance with the current in the circuit 3 through the current transformer 11, while the coils 19 and 20 are connected to be energized in accordance with the potential of the circuit through a potential transformer 22.

If $K_1$, $K_2$ and $K$ represent constants: $f_1(\phi)$, $f_2(\phi)$ and $f(\phi)$ functions of the angular position or displacement of the movable coil 20 or the contact 7 from an arbitrary reference line, and $e$, $i$ and $\theta$ the potential and current of the circuit 3 and the phase angle between them, and assuming that the constants of the circuits of the current and potential coils are so chosen that the currents in the stationary coils 18 and 19 are in phase when the power factor of the circuit 3 is unity, then the torques $T_1$ and $T_2$ between the coils 18 and 20 and between the coils 19 and 20 respectively, due to the magnetic forces existing between them and tending to position the movable coil so as to establish equilibrium are:

$$T_1 = K_1 ei \cos\theta f_1(\phi)$$
$$T_2 = K_2 e^2 f_2(\phi)$$

The angular position of the movable coil 20 resulting from the balancing of these torques is dependent on the relative values of the current and potential of the circuit and these in turn upon the resistance $R$ or reactance $X$ or both, thus $$K_1 ei \cos\theta f_1(\phi) = K_2 e^2 f_2(\phi)$$
$$\frac{f_1(\phi)}{f_2(\phi)} = \frac{K_2 e^2}{K_1 ei \cos\theta} = \frac{K_2 e}{K_1 i \cos\theta}$$
$$f(\phi) = K \frac{e}{i \cos\theta} = K \frac{Z}{\cos\theta} = K \frac{R^2 + X^2}{R}$$
$$f(\phi) = K \cdot f(R,X)$$

If the constants of the circuits of the current and potential coils are so chosen that the currents in the stationary coils 18 and 19 are in quadrature when the power factor of the circuit is unity, then the expression for the position of the movable coil 20 is $$f(\phi) = K \frac{e}{i \sin\theta} = K \frac{R^2 + X^2}{X} = K \cdot f(R,X)$$

Consequently, the position of the coil 20 is determined by the ohms of the circuit, that is to say, the position of the contact 7 depends on the relative values of the current and potential at the point where the protective device is located. Thus with high ohms, the contact 7 will be in the position shown in Fig. 1, but as the ohms decrease, assuming no reversal of power in the circuit, the contact 7 will move in the direction indicated by the arrow 23, that is toward the contact 6. The time of movement for any change in ohms will be substantially instantaneous, but the contact 6 which moves in response to a predetermined current at a speed dependent thereon can travel only a distance determined by the position of the contact 7 before completing the trip coil circuit. Therefore, the time taken to close the contacts with any predetermined current is dependent on the relative values of the current and potential or, as shown in the formulæ, some function of the reactance and resistance.

While a dynamometer type of ohm meter connected as in Fig. 1 is inherently directional in effect, that is to say, tends to move the contact 7 away from the contact 6 on the occurrence of a fault causing a reversal of power, the torque between the coils 19 and 20 tending to turn the coil 20 in this direction, irrespective of the direction of power, being proportional to $e^2$ is small, particularly when the fault is severe, since the potential may drop practically to zero.

To overcome this feature, but at the sacrifice of the directional effect, the movable coil 20 may be connected to be energized in accordance with the current instead of the potential. In this case, depending on the constants chosen for the circuits of the stationary coils, we have:

$$T_1 = K_1 i^2 f_1(\phi) \text{ and } T_2 = K_2 ei \cos\theta f_2(\phi)$$
$$f(\phi) = K \frac{e \cos\theta}{i} = KZ \cos\theta = KR$$
$$f(\phi) = K \cdot f(R)$$
$$\text{or } T_1 = K_1 i^2 f_1(\phi) \;\; T_2 = K_2 ei \sin\theta f_2(\phi)$$
$$f(\phi) = K \frac{e \sin\theta}{i} = KZ \sin\theta KX$$
$$f(\phi) = K \cdot f(X)$$

Thus the position of the movable coil 20 is dependent on a function of the resistance or reactance and therefore the time taken to close the trip coil circuit is dependent on the one or the other. Since the resistance may vary depending on whether the fault is a metal to metal contact or an arc over, the reactance may be the preferred function, for then the difference between the resistances due to the different nature of the effects producing the fault would not tend to cause incorrect relay operation.

The embodiments of my invention illustrated in Figs. 2 and 3 comprise an ohm meter of the induction disk type. This ohm meter comprises a disk 24 and current actuating and potential restraining means, such as two shaded pole motor elements 25 and 26, arranged to exert opposing torques on the disk and to be energized respectively in accordance with the current and potential of the circuit 3. The material of the disk 24 is so distributed, for example by a series of suitably proportioned slots 27, as to tend to equilibrate the torques of the potential restraining and current actuating means.

If we assume under normal conditions of current and potential that the disk 24 is in the position shown, then when the potential decreases or the current rises or both happen, the current actuating means 25 will predominate and move the disk substantially instantaneously in the direction indicated by the arrow 28 until the material of the disk interposed between the poles of the motor element 25 is so diminished that the torque thereof is equal to the torque of the potential motor element 26. Assuming the quantities as heretofore outlined, the torques of the current and potential elements are respectively $$T_1 = K_1 i^2 f_1(\phi) \text{ and } T_2 = K_2 e^2 f_2(\phi)$$

$$\frac{f_1(\phi)}{f_2(\phi)} = \frac{K_2 e^2}{K_1 i^2}$$

$$f(\phi) = K\left(\frac{e}{i}\right)^2 = KZ^2 = K(R^2 + X^2)$$

$$f(\phi) = K \cdot f(R, X)$$

Consequently the position which the disk 24 takes, that is, the position of the contact 7, is dependent on the impedance of the circuit, that is an ohmic characteristic of the circuit. Therefore, since the position of the contact 7 determines the amount of movement the contact 6 may have on the occurrence of a fault, the time of closure of the trip coil circuit is dependent on the impedance of the circuit.

In order to improve the time-ohm characteristic of the protective apparatus embodying my invention as shown in Figs. 1 and 2, I may provide a time limit electro-responsive device 1 as shown in Fig. 3, wherein the speed of the movement of the contact 6 is made dependent on not only the current but also the potential. In this way, I am enabled to take further advantage of the variation in the relative values of the current and potential in case of a fault so as to increase the operating range of the apparatus, that is to obtain a more selective timing action throughout a wider ohmic range.

The time limit device 1 shown in Fig. 3 comprises a movable member, such as an induction disk 29, and current actuating and potential restraining means, such as two shaded pole motor elements 30 and 31, arranged to exert opposing torques on the disk and to be energized respectively in accordance with the current and potential of the circuit. A damping magnet 32 may be provided to retard the movement of the disk. The disk 29 is mounted on a spindle 33 suitably geared to the spindle 16 which carries the contact 6 and is biased by a spring 34 for movement in a direction to hold the contact 6 against the stop 17.

The current actuating means 30 tends to turn the disk 29 in the direction indicated by the arrow 35 while the potential restraining means 31 and the spring 34 tend to turn the disk in the opposite direction. Normally the potential restraining means 31 and the spring 34 predominate to hold the contact 6 against stop 17 in the position shown. On the occurrence of a fault the increase in the current or decrease in the potential or both result in movement of the disk in the direction indicated by the arrow 35, and therefore the contact 6 towards the contact 7, at a speed dependent on the relative values of the current and potential with a retarding action by the drag magnet 32 dependent on the speed. As heretofore explained, the travel of the contact 6 is limited by the position of the contact 7 which is determined by the impedance of the circuit. Therefore, since both the speed and the travel of the contact 6 are dependent upon the relative values of the current and potential, a highly selective time action is obtained.

Since in each of the illustrated embodiments of my invention the movable member controlled by the ohm element 2 is independent of the movable member controlled by the time limit element 1, adjustments can be made to either of these elements without disturbing the adjustments of the other. Referring, for example, to Fig. 2, the initial position of the contact 7, that is with normal current and potential, can be varied by changing the positions of the motor elements 25 and 26 relatively to the slots 27 without interferring with the adjustments of the time limit device 1 which in turn may be adjusted for different predetermined currents by taps on the winding 10 or changing the initial tension of the spring 14.

In the illustrated embodiments of my invention, it is to be noted that the ohm element 2 through its movable member 7, which moves substantially instantaneously, determines, in accordance with some function of the resistance or reactance or both, the distance through which the movable member 6 of the time limit element 1 can move while the speed of the movable member 6 is dependent on the current or the relative values of the current and potential. Therefore, since the time taken to effect engagement of the members 6 and 7 varies directly with the distance and inversely with the speed, selective time action dependent on an ohmic characteristic of the circuit that is a function of the resistance, or reactance, or both, and on the current or the relative values of the current and potential, is insured.

Although I have shown and described my invention in considerable detail, I do not desire to be limited to the exact arrangements shown, but seek to cover in the appended claims all those modifications that fall within the true spirit and scope of my invention.

What I claim as new and desire to secure by Letters Patent of the United States, is:

1. In combination with an electric circuit, two relatively movable members, each arranged for movement in the path of movement of the other, a time limit electroresponsive device for moving one of said members at a speed dependent on the relative values of the current and potential of the circuit and means comprising current and potential windings for positioning the other member in accordance with an ohmic characteristic of the circuit between two points thereof, whereby to control the time required by the first member to engage the other.

2. In combination with an electric circuit and circuit interrupting means therefor, means for controlling said interrupting means on the occurrence of a fault comprising a time limit relay and an electroresponsive device arranged to control the time of said relay in accordance with an ohmic characteristic of the circuit between the fault point and another point thereof.

3. A protective device comprising relatively movable cooperating contacts and means for controlling the relative movement thereof comprising an ohm meter and a time limit relay.

4. In combination with an electric circuit, a protective device comprising reatively movable cooperating contacts and means for actuating said contacts on the occurence of a fault in a time dependent on the current and the relative values of the current and the potential comprising a time limit relay having a current responsive winding and means comprising a movable member arranged to take a position dependent on the ratio of the potential to the current.

5. An electric circuit protective device comprising relatively movable cooperating contacts, a time element adapted to be connected to the circuit to be protected and arranged on the occurrence of a fault to actuate one of said contacts, and an ohm meter adapted to be connected in the circuit and arranged to position the other of said contacts in accordance with the impedance of the circuit between a predetermined point and the point of fault.

6. A relay for protecting an electric circuit comprising two relatively movable cooperating contacts, an ohm responsive element for positioning one of said contacts in accordance with the impedance of the circuit between the relay and a fault point, and means provided with a current winding and arranged on the occurrence of a fault to move the other of said contacts in a direction to engage the first contact.

7. A protective device comprising relatively movable cooperating contacts, an ohm meter for controlling one of said contacts and means comprising a current winding for controlling another of said contacts.

8. In combination with an electric circuit, a relay energized from said circuit and comprising relatively movable cooperating contacts, means operative on the occurrence of a fault for positioning one of said contacts in accordance with an ohmic characteristic of the circuit between the fault point and the relay location, and means comprising a winding connected to be energized in accordance with the current of the circuit for moving another of said contacts in a direction to engage the first contact.

9. In combination with an electric circuit, a protective device comprising relatively movable cooperating contacts and means for actuating said contacts comprising a time limit relay having a current actuating winding and a potential restraining winding and an ohm meter having a movable member adapted to take a position dependent on the relative values of the potential and the current of the circuit.

10. In combination with an electric circuit, a protective device comprising relatively movable cooperating contacts and means for actuating said contacts comprising an over-current time relay and an ohm meter having a movable member adapted to take a position dependent on the relative values of the potential and the current of the circuit.

11. In an electric circuit protective device, a movable disk, current actuating means tending to move the disk in one direction, and potential restraining means tending to move the disk in the opposite direction characterized by the fact that the material in the disk is so distributed as to tend to equilibrate the effects of said current and potential means whereby said disk is adapted to take a position dependent on the relative values of the current and potential of the circuit.

12. In an electric circuit protective device, two independently movable members each arranged to be controlled by a current actuating means and a potential restraining means characterized by the fact that the material in each of the members is so distributed that one of the members takes a position dependent on the relative value of the current and the potential and the other member tends to move at a speed dependent on the relative values of the current and the potential.

13. An electric circuit and a protective device therefor comprising relatively movable cooperating contacts and means for controlling the actuation thereof comprising a time element relay having a current responsive winding and an ohm meter for selectively determining the time of actuation of said contacts in accordance with the relative values of the current and potential of the circuit.

14. Electric circuit protective apparatus comprising relatively movable cooperating contacts, an induction disk ohm meter for controlling one of said contacts comprising a movable disk, current actuating means tending to move the disk in one direction, and potential restraining means tending to move the disk in the opposite direction, the material in said disk being so disposed as to tend to equilibrate the effects of said current and potential means whereby the disk is adapted to take a position dependent on the relative values of the current and the potential of a circuit and a time element relay for actuating the other of said contacts, comprising a movable member, current actuating means tending to move the member in one direction and potential restraining means tending to move the member in the opposite direction normally predominant to overcome the effect of the current actuating means whereby upon the occurrence of a fault the current actuating means overcomes the potential restraining means to effect movement of the member at a speed dependent on the relative values of the current and the potential.

15. A control device comprising relatively movable cooperating members and means for controlling the relative movement thereof comprising an ohm meter for actuating one of said members and a time limit relay for actuating another of said members.

16. An electric circuit protective relay comprising two independently movable members, means for moving one member in accordance with the current of a circuit to be protected, means for moving the other member in accordance with a potential of the circuit, and means for opposing the movement of said other member independently of the speed thereof and in accordance with the current of the circuit.

17. An electric circuit protective relay comprising two independently movable cooperating members, means for actuating one member in accordance with the current of a circuit to be protected, means for exerting on the other member an effect dependent on the difference between a function of a potential of the circuit and a function of the current of the circuit.

18. An electric circuit protective relay comprising two rotatable disks, means for exerting on one disk a torque dependent on the current of a circuit to be protected, means for exerting on the other disk a torque dependent on a potential of the circuit, and means for exerting on said other disk a counter-torque arranged to vary in accordance with the current of the circuit and the position of the disk.

19. An electric circuit protective relay comprising two rotatable disks, means for exerting on one disk a torque dependent on the current of a circuit to be protected, means for exerting on the other disk a torque dependent on a potential of the circuit, and means for exerting on said other disk a counter-torque arranged to vary as the circuit current increases.

In witness whereof, I have hereunto set my hand this 19th day of August, 1925.

OLIVER C. TRAVER.

Certificate of Correction

Patent No. 1,814,869. Granted July 14, 1931, to

OLIVER C. TRAVER

It is hereby certified that error appears in the printed specification of the above numbered patent requiring correction as follows: Page 2, lines 99 and 100, strike out the equation and insert instead $$f(\phi) = K \frac{e \sin \Theta}{i} = KZ \sin \Theta = KX$$

and page 4, line 113, claim 12, for "value" read *values;* and that the said Letters Patent should be read with these corrections therein that the same may conform to the record of the case in the Patent Office.

Signed and sealed this 1st day of September, A. D. 1931.

[SEAL.]

M. J. MOORE,
*Acting Commissioner of Patents.*